United States Patent
Temple, Jr.

(10) Patent No.: US 11,541,549 B2
(45) Date of Patent: Jan. 3, 2023

(54) MOBILE CHARACTER CONTROL SYSTEM

(71) Applicant: Universal City Studios LLC, Universal City, CA (US)

(72) Inventor: Ricky Recardo Temple, Jr., Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/683,015

(22) Filed: Nov. 13, 2019

(65) Prior Publication Data
US 2020/0262085 A1 Aug. 20, 2020

Related U.S. Application Data

(60) Provisional application No. 62/805,682, filed on Feb. 14, 2019.

(51) Int. Cl.
| | |
|---|---|
| A63J 99/00 | (2009.01) |
| B25J 13/06 | (2006.01) |
| A63J 19/00 | (2006.01) |
| B25J 13/04 | (2006.01) |
| B25J 13/02 | (2006.01) |
| B25J 9/16 | (2006.01) |

(52) U.S. Cl.
CPC .......... B25J 13/065 (2013.01); A63J 19/006 (2013.01); B25J 9/1689 (2013.01); B25J 13/02 (2013.01); B25J 13/04 (2013.01)

(58) Field of Classification Search
CPC ........ B25J 13/065; B25J 9/1689; B25J 13/02; B25J 13/04; A63J 19/006

USPC .......................................................... 700/245
See application file for complete search history.

(56) References Cited

U.S. PATENT DOCUMENTS

| | | |
|---|---|---|
| 3,390,481 A | 7/1968 | Runanin |
| 4,660,033 A | 4/1987 | Brandt |
| (Continued) | | |

FOREIGN PATENT DOCUMENTS

| | | |
|---|---|---|
| CN | 1496749 A | 5/2004 |
| CN | 102131621 A | 7/2011 |
| (Continued) | | |

OTHER PUBLICATIONS

CBC News, "Giant marionettes take over Montreal," May 20, 2017, CPC News, whole video. URL https://texashillcountry.com/massive-puppets-fantastical-performances/ (Year: 2017).*

(Continued)

*Primary Examiner* — Tyler J Lee
*Assistant Examiner* — Tiffany P Ohman
(74) *Attorney, Agent, or Firm* — Fletcher Yoder, P.C.

(57) ABSTRACT

A mobile character control system includes a platform, a character assembly, a control system, and a transportation assembly. The platform is configured to support an operator. The character assembly is engaged with the platform and includes actuatable features configured to simulate movement of a creature. The control system is configured to control activation of the actuatable features of the character assembly in response to signals received from control features controlled by the operator. The transportation assembly is configured to direct movement of the platform and to support the character assembly.

18 Claims, 3 Drawing Sheets

(56) References Cited

U.S. PATENT DOCUMENTS

| | | | |
|---|---|---|---|
| 4,825,136 A | 4/1989 | Farhat | |
| 5,052,680 A | 10/1991 | Malewicki et al. | |
| 5,289,273 A | 2/1994 | Lang | |
| 5,493,185 A | 2/1996 | Mohr et al. | |
| 5,845,540 A | 12/1998 | Rosheim | |
| 5,976,019 A * | 11/1999 | Ikeda | A63F 9/143 463/58 |
| 6,016,385 A | 1/2000 | Yee et al. | |
| 6,198,247 B1 | 3/2001 | Barr | |
| 6,377,281 B1 | 4/2002 | Rosenbluth et al. | |
| 2005/0148279 A1 | 7/2005 | Maa | |
| 2005/0153624 A1 | 7/2005 | Wieland et al. | |
| 2010/0144239 A1 | 6/2010 | Eck et al. | |
| 2013/0023351 A1 * | 1/2013 | Kanemaru | A63J 7/005 472/84 |

FOREIGN PATENT DOCUMENTS

| | | | |
|---|---|---|---|
| CN | 102728074 A | 10/2012 | |
| CN | 102800117 A | 11/2012 | |
| CN | 202605745 U | 12/2012 | |
| CN | 207656673 U | 7/2018 | |
| JP | H05237269 A | 9/1993 | |
| WO | WO-2009037741 A1 * | 3/2009 | A63J 7/005 |

OTHER PUBLICATIONS

TPMvids, "Disney's Festival of Fantasy Full Parade—Magic Kingdom Walt Disney World," Dec. 16, 2017, YouTube, https://www.youtube.com/watch?v=UWtJbCPgVms, whole video. (Year: 2017).*

TPMvids, "Top 12 Amazing Disney Parade Floats," Aug. 21, 2019, YouTube, https://www.youtube.com/watch?v=DfDm7ZbcRQs, whole video. (Year: 2019).*

Attractions Magazine, "Behind the scenes—Main Street Electrical Parade and Disney's Summer Nightastic," May 27, 2010, YouTube, https://www.youtube.com/watch?v=ucXHPX4Ozh0, whole video (Year: 2010).*

Aram, "Animation System Revamp Summary," Apr. 27, 2018, Aram's Website, Electronics Projects, whole document. (Year: 2018).*

PCT/US2020/017101 International Search Report and Written Opinion dated Apr. 23, 2020.

CN Office Action for Chinese Application No. 202080014184.0 dated Oct. 19, 2022.

* cited by examiner

MOBILE CHARACTER CONTROL SYSTEM

CROSS REFERENCE TO RELATED APPLICATIONS

This application claims priority from and the benefit of U.S. Provisional Application Ser. No. 62/805,682, entitled "MOBILE CHARACTER CONTROL SYSTEMS" filed Feb. 14, 2019, which is hereby incorporated by reference in its entirety for all purposes.

BACKGROUND

The present disclosure relates generally to control systems and, more specifically, to a mobile character control system.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Generally, puppets, characters, marionettes, and/or other creatures may appear to move via actions of a performer, such as a puppeteer, and/or through mechanical actuators. In some cases, movement of the puppeteer may generate corresponding movement of the puppet, character, marionette, and/or creature, which may generate an illusion or impression that the puppet, character, marionette, and/or creature is alive. Similarly, actuators, motors, and/or other drives may be utilized to cause movement of the puppet, character, marionette, and/or creature in addition to, or in lieu of, movement of the performer. In some cases, movement of the puppet, character, marionette, and/or creature may be limited by the ability of the performer. Additionally or alternatively, an audience viewing the puppet, character, marionette, and/or creature may notice a performer controlling the actuators, motors, and/or drives, thereby reducing a sense of realness of the puppet, character, marionette, and/or creature.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a mobile character control system includes a platform configured to support an operator, a character assembly engaged with the platform, a control system, and a transportation assembly. The character assembly includes actuatable features configured to simulate movement of a creature. The control system is configured to control activation of the actuatable features of the character assembly in response to signals received from control features controlled by the operator. The transportation assembly is configured to direct movement of the platform, and the transportation assembly is configured to support the character assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
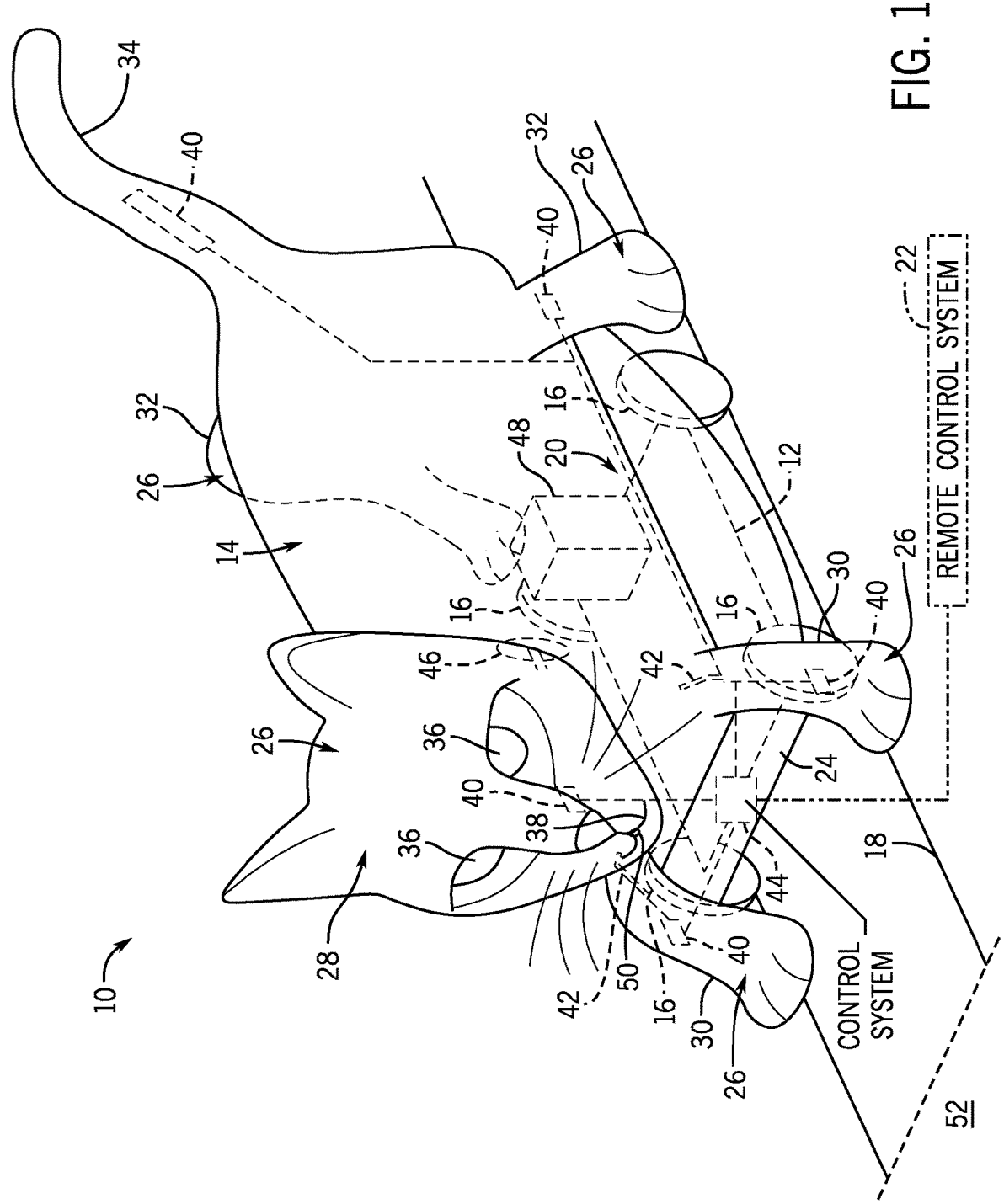
FIG. 1 is a perspective view of an embodiment of a mobile character control system, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Utilizing puppets, marionettes, or other automated figures (e.g., characters) may provide an illusion that an otherwise fictional character or creature is alive or active. For example, a performer may cause movement of a puppet via movement of the performer. The performer may move features of the puppet (e.g., a head, arms, legs, and/or mouth) to mimic or act out movement of the puppet and generate an illusion that the puppet is alive. Additionally or alternatively, the puppet may be controlled via actuators, motors, and/or other drives that cause movement of the puppet either remotely or by a performer in close proximity to the puppet. Unfortunately, movement of the puppet caused by the performer may be limited because the performer may only control certain portions or parts of the puppet. Additionally, in some cases, audience members may recognize that the performer is directing the movement of the puppet either via movement of the performer or via controls associated with an actuator. It should be noted that the terms character, puppet, marionette, animated feature, and automated figure are interchangeably utilized throughout this disclosure to reference puppets or other figures that may have their movement controlled to provide an illusion of autonomous movement.

Embodiments of the present disclosure are directed toward an improved character control system that may conceal a performer's ability to control and/or actuate control of movement of a puppet or marionette. For instance, the present disclosure relates to a mobile character control system that enables an operator to control movement of a character assembly while being concealed by features that resemble a creature or character. For example, the mobile character control system may include a cart, dolly, wheel chassis, and/or another suitable transportable frame that may support the character assembly. The character assembly may include structural components or features that resemble the creature or character, actuators (e.g., electronic motors, hydraulic motors) for controlling movement of the components or features, automated control features (e.g., buttons, steering wheels, joysticks, pedals) for activating or deactivating the actuators, manual control features (e.g., stilts, handholds, footholds) for controlling movement of the components or features, auxiliary features, and any combination thereof. As such, the operator may be positioned or seated within the mobile character control system or remotely from the mobile character control system to control movement of the character assembly to simulate lifelike movement of the creature or character.

Turning to the drawings, FIG. 1 is a perspective view of an embodiment of a mobile character control system 10, in accordance with embodiments of the present disclosure. As shown in the illustrated embodiment of FIG. 1, the mobile character control system 10 includes a transportation assembly 12 and a character assembly 14. The transportation assembly 12 may include wheels 16 that are configured to enable movement of the mobile character control system 10. In other embodiments, the transportation assembly 12 may include conveyors, a track system, or any other suitable component configured to drive movement of the mobile character control system 10. In some embodiments, the transportation assembly 12 may direct the mobile character control system 10 along a track 18 that directs movement of the mobile character control system 10 along a predetermined path. In other embodiments, the transportation assembly 12 may enable movement of the mobile character control system 10 along any suitable path, which may be controlled by an operator, for example. In some embodiments, the operator may be positioned or seated within a compartment 20 of the mobile character control system 10. In other embodiments, the operator may be positioned remotely from the mobile character control system 10 and configured to control operation of the mobile character control system 10 via a remote control system 22.

The character assembly 14 may include a character frame 24 that resembles a specific creature or character (e.g., an android, a cat, a dinosaur, or another organic or animated being). In some embodiments, the character assembly 14 may be removably coupled to the transportation assembly 12, such that the mobile character control system 10 may resemble multiple creatures or characters by replacing the character assembly 14. As shown in the illustrated embodiment of FIG. 1, the character assembly 14 may include actuatable features 26, such as a head 28, front legs 30 (or arms), hind legs 32, a tail 34, eyes 36, a mouth 38, and/or other suitable features. The actuatable features 26 may be controlled via actuators 40 and/or manual control devices 42 (e.g., stilts, handholds, footholds). The mobile character control system 10 may further include a control system 44 that communicatively couples the actuators 40 to various controls 46 (e.g., buttons, wheels, joysticks, control pads) and/or the remote control system 22 that may be configured to activate, control, and/or deactivate the actuators 40.

In some embodiments, the mobile character control system 10 includes auxiliary features 48 that may be accessories or other features consistent with a theme of the character assembly 14. For example, the auxiliary features 48 may include a spray nozzle 50 that may be configured to direct a fluid flow from the mouth 38 of the character assembly 14 toward an interactive zone 52 where guests may be located and/or toward another suitable location. The auxiliary features 48 may form a portion of the character assembly 14 and/or be separate features from the character assembly 14.

Figure 2:
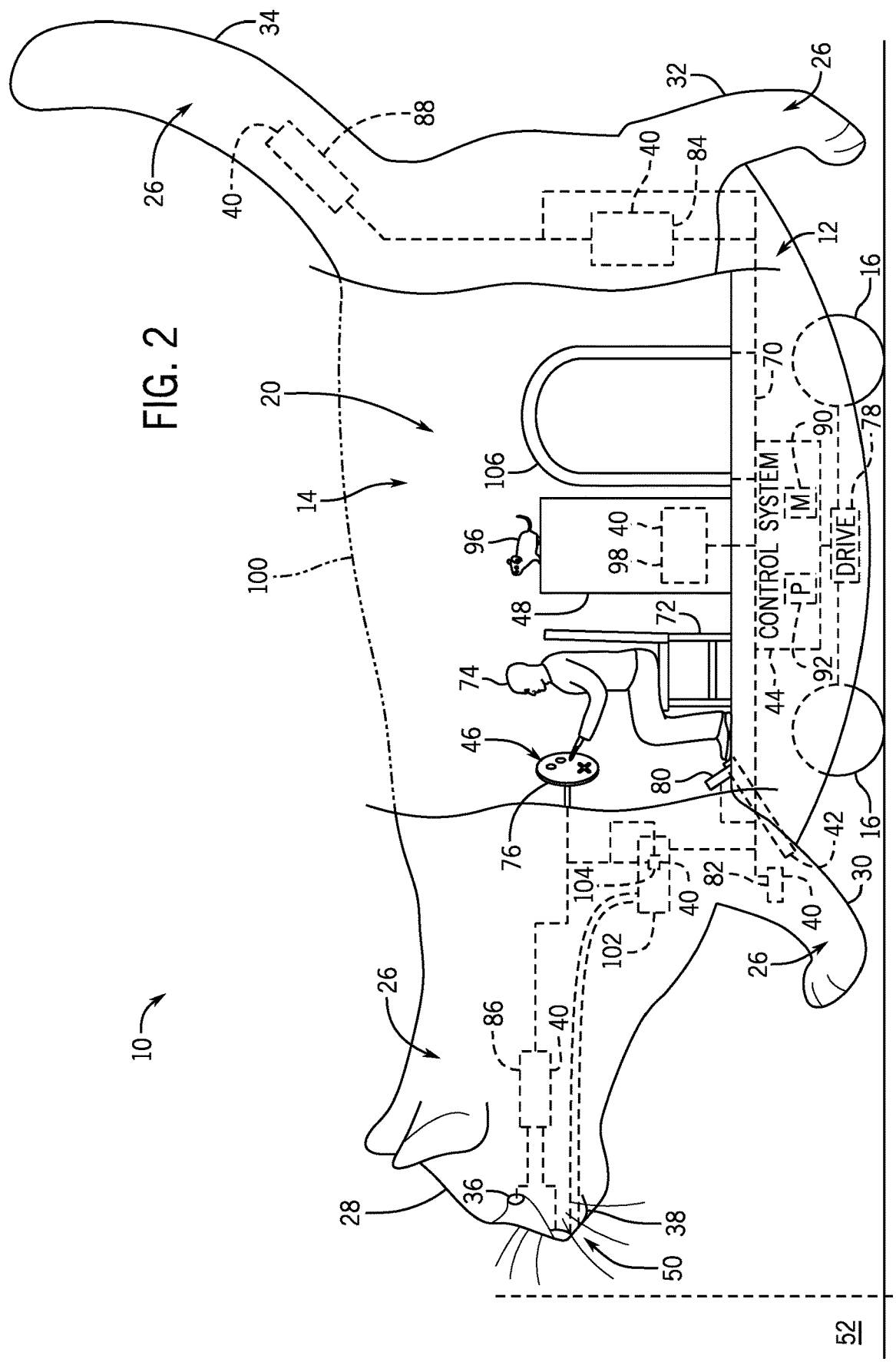
FIG. 2 is a cross-sectional side view of an embodiment of the mobile character control system, in accordance with aspects of the present disclosure.

FIG. 2 is a cross-sectional side view of the mobile character control system 10 further detailing features and controls of the transportation assembly 12, the character assembly 14, and the auxiliary features 48. For instance, the character assembly 14 may be disposed on or otherwise coupled to the transportation assembly 12 via a platform 70 (e.g., frame) of the transportation assembly 12. The character assembly 14 may at least partially form the compartment 20, which may include a seat 72 for an operator 74. In other words, the character assembly 14 may enclose and/or conceal the operator 74 from a view of guests in the interactive zone 52, such that guests may not view the operator 74, and thus, believe that the mobile character control system 10 is a living, organic or otherwise animated being (e.g., a monster, robot, or android).

As shown in the illustrated embodiment of FIG. 2, the compartment 20 includes a steering mechanism 76 (e.g., a steering wheel), which may include the various controls 46 to enable the operator 74 to activate the actuatable features 26. The steering mechanism 76 may be communicatively coupled to the control system 44, which may send or receive signals to and from the actuatable features 26. Further, the control system 44 may be coupled to a drive 78 (e.g., a motor) that is configured to direct movement of the mobile character control system 10 via the transportation assembly 12. For example, the drive 78 may be configured to control movement of the wheels 16 and/or other suitable components that cause movement of the mobile character control system 10. In some embodiments, the control system 44 may also be communicatively coupled to pedals 80 that enable the operator 74 to control or supply power to the drive 78, thereby rotating the wheels 16 to cause movement of the mobile character control system 10.

The control system 44 may further be communicatively coupled to the actuators 40 to enable movement and/or control of the actuatable features 26. As shown in the illustrated embodiment of FIG. 2, the character assembly 14 includes a first actuator 82 configured to control movement of the front legs 30. In some embodiments, the first actuator 82 may be configured to move the front legs 30 in a back and forth motion to simulate movement of the character or creature. The first actuator 82 may move the front legs 30 in response to motion of the wheels 16 and/or in response to a control signal directed to the control system 44 by one of the controls 46 activated by the operator 74. Similarly, the character assembly 14 includes a second actuator 84 configured to move the hind legs 32. In some embodiments, the second actuator 84 may be configured to move the hind legs 32 in a back and forth motion to simulate movement of the character or creature. The second actuator 84 may move the hind legs 32 in response to motion of the wheels 16 and/or in response to the control signal directed to the control system 44 by one of the controls 46 activated by the operator 74.

In an embodiment, the control system 44 is configured and/or programmed to coordinate actuators in differing sequences and manners (e.g., types of motion) based on combinations of control inputs and/or sensor inputs. It should be noted that different types of motion include different motion profiles, which may be described as different sequences of locations in space. Merely increasing the speed of a particular type of motion would not be considered a different type of motion. To provide more realistic movements and transitions between types of movements, for example, the control system 44 may take into account turning of the steering mechanism 74, a direction of travel, a speed of travel, and the like to provide combinations of movements of the actuatuable features 26 (e.g., the head 28, the front legs 30 (or arms), the hind legs 32, the tail 34, the eyes 36, the mouth 38, and/or other suitable features). Specifically, for example, if the steering mechanism 74 is being turned in a direction while the transportation assembly 12 is not traveling, actuators may operate in a first manner that simulates a different kind of physical activity or type of motion (e.g., shuffling legs and feet of the character). If the steering mechanism 74 is being turned while the transportation assembly 12 is traveling, a second manner of operation may be employed to provide another type of motion (e.g., to simulate legs and feet of the character ambulating). Similarly, speed may be taken into account to provide further and different types or manners of motion. For example, higher speeds may cause actuation that resembles a gallop while lower speeds may cause actuation that resembles a slow walk. These are not merely the same type of motion at different speeds. Furthermore, reverse and forward motions may cause different types of actuations to resemble scurrying backward or sprinting forward. In accordance with present embodiments, moving backward would not result in a mere reversal of the motions for moving forward. Similarly, as previously noted, moving in a direction while turning would not merely provide the same motions as turning while stationary. The technical benefits of these control configurations and programs include more realistic and immersive systems that draw audiences into a desired illusion.

Further, the character assembly 14 may include a third actuator 86 configured to move the head 28, the eyes 36, and/or the mouth 38. While the illustrated embodiment of FIG. 2 shows the third actuator 86 controlling the head 28, the eyes 36, and the mouth 38, in other embodiments, the character assembly 14 may include additional actuators 40 that control the head 28, the eyes 36, and the mouth 38 individually or independently of one another. Further, the character assembly 14 includes a fourth actuator 88 that may be configured to move the tail 34. The third actuator 86 and/or the fourth actuator 88 may be activated or controlled by the operator 74 via one or more of the controls 46. In other embodiments, the third actuator 86 and/or the fourth actuator 88 may be activated via a preprogrammed sequence stored in memory 90 and executed by a processor 92 of the control system 44. For example, the controls 46 may enable the operator 74 to place the character assembly 14 into an idle state, where movement of the actuatable features 26 of the character assembly 14 follow a predetermined or preprogrammed sequence. The idle state may be defined as a state of control that is entered by control aspects (e.g., the control system 44) of the character assembly 14 upon activation by the operator 74 and/or after a threshold time of inactivity (e.g., no actuation of the controls 46 for a period of 30 seconds). For example, the operator 74 may activate the control 46 to place the character assembly 14 into the idle state and enable the movement without further interaction by the operator 74. Additionally or alternatively, the control system 44 may detect that the operator 74 has not engaged the controls 46 within a predetermined time interval (e.g., 10 seconds, 20 seconds, 30 seconds) and automatically place the character assembly 74 in the idle state.

In some embodiments, the actuatable features 26 may also be controlled manually by the operator 74. For instance, the character assembly 14 includes the manual controls 42 (e.g., stilts, hand holds) that the operator 74 physically moves in order to generate movement of the actuatable features 26. The manual controls 42 may enable the character assembly 14 to move in a more lifelike manner by mimicking or otherwise moving in response to movement of the operator 74. In any case, the character assembly 14 may be configured to move either via the actuators 40 and/or the manual controls 42 to generate an illusion or perception that the character is an organic being or otherwise animated.

Further, the character assembly 14 includes the auxiliary feature 48, which may be portrayed as a telescoping stand having a secondary character 96. In some embodiments, the telescoping stand may be controlled by a fifth actuator 98 that moves the secondary character beyond and/or above a barrier 100 of the character assembly 14 to come into view of the guests in the interactive zone 52. The fifth actuator 98 may be communicatively coupled to the control system 44, which may actuate the telescoping stand and direct movement of the second character 96 in response to activation of one of the controls 46 by the operator 74. In other embodiments, the auxiliary feature 48 may include the telescoping stand configured to simulate craning or other movement of a portion (e.g., the back) of the character. In still further embodiments, the auxiliary feature 48 may include a plant, a prop, a saddle, and/or another suitable feature that is consistent with a theme of the character assembly 14.

As discussed above, the character assembly 14 may also include the spray nozzle 50 that is coupled to a fluid tank 102 that supplies fluid for the spray nozzle 50. In some embodiments, a sixth actuator 104 (e.g., a pump) may direct fluid from the fluid tank 102 out of the mouth 38 of the character assembly 14. As such, the sixth actuator 104 may be communicatively coupled to the control system 44 and direct fluid from the fluid tank 102 in response to activation of one of the controls 46 by the operator 74. In some embodiments, the spray nozzle 50 may be incorporated into the auxiliary feature 48 and enable fluid to be directed from the auxiliary feature either in addition to, or in lieu, of directing fluid from the mouth 38 of the character assembly 14.

The character assembly 14 and/or the transportation assembly 12 may further include a secondary or supplemental transportation device 106, such as a hydraulic motion bar that may utilize hydraulic fluid and/or hydraulic pressure to enable movement of the mobile character control system 10. In some embodiments, the secondary or supplemental transportation device 106 may be configured to lift and/or lower the platform 70 of the transportation assembly 12 to control movement of the wheels 16. For example, the operator 74 may manually raise a position of the platform 70 to a predetermined height that enables the wheels 16 to roll along the ground and/or the track 18, such that the mobile character control system 10 may be pushed or rolled by the operator 74. Additionally, the operator 74 may block movement of the mobile character control system 10 by utilizing the secondary or supplemental transportation device 106 to lower the platform 70 to an additional predetermined height (e.g., lower than the predetermined height with respect to the ground). In other words, the platform may be positioned on the ground and/or another surface to block movement of the mobile character control system 10 and the wheels 16. Accordingly, the mobile character control system 10 may engage in movement either via the drive 78 and/or the secondary or supplemental transportation device 106.

Figure 3:
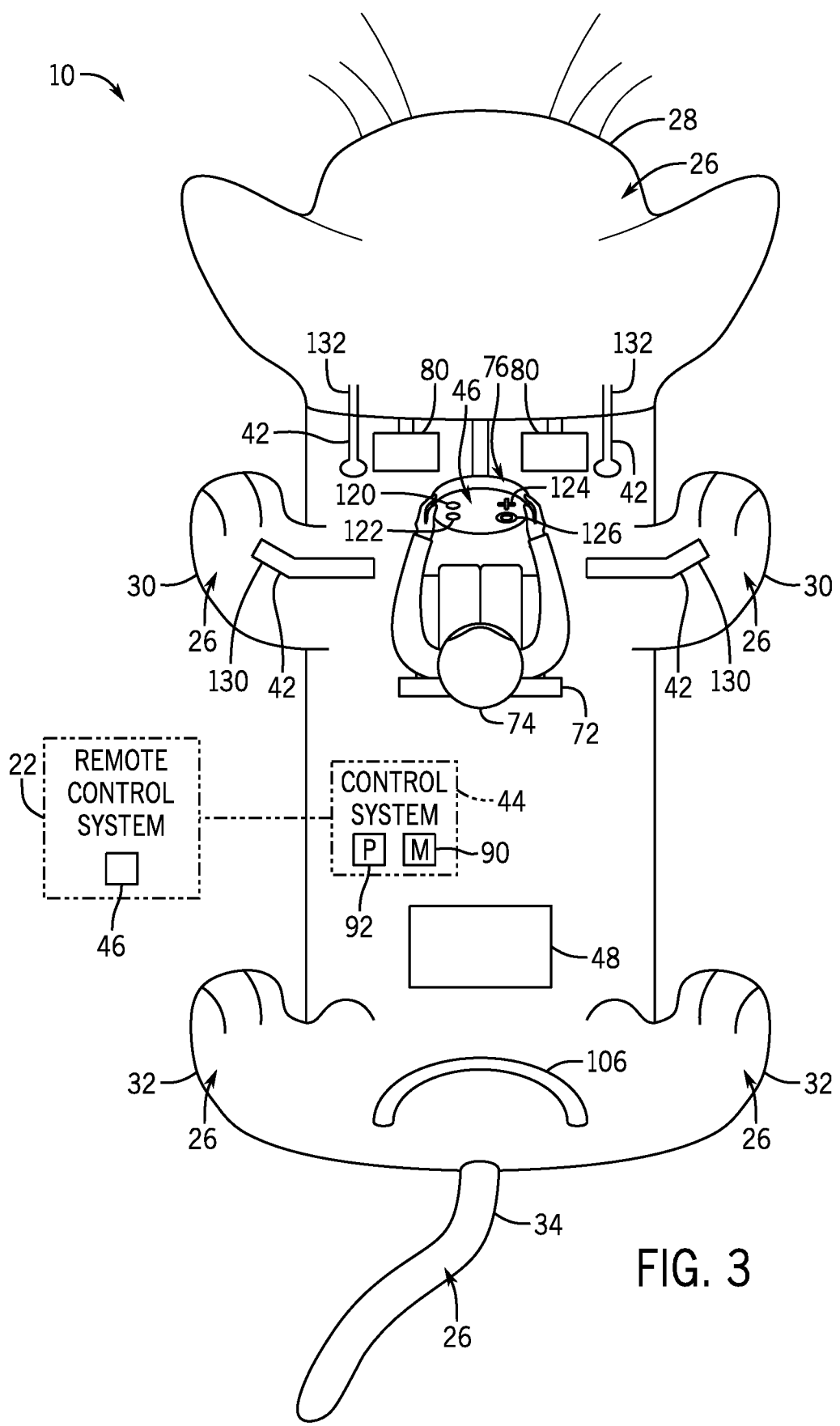
FIG. 3 is a top view of an embodiment of the mobile character control system, in accordance with aspects of the present disclosure.

FIG. 3 is an overhead view of an embodiment of the mobile character control system 10. Specifically, FIG. 3 illustrates the various controls 46 that may be utilized by the operator 74 to activate, deactivate, or otherwise control the acuatable features 26. Additionally, FIG. 3 shows the manual control devices 42 that may be worn or otherwise utilized by the operator 74 to manually control movement of the character assembly 14. For example, as shown in the illustrated embodiment of FIG. 3, the steering mechanism 76 (e.g., the steering wheel) may include the various controls 46, such as a first button 120, a second button 122, a control pad 124, and/or a joystick 126. The operator 74 may press the first button 120 and/or the second button 122 to switch control between the various actuatable features 26 and/or to activate the actuatable features 26. In some embodiments, the control pad 124 and/or the joystick 126 may be utilized by the operator 74 to adjust a position of the head 28, the front legs 30 (or arms), the hind legs 32, the tail 34, the eyes 36, the mouth 38, and/or other suitable features of the character assembly 13. Further still, the first button 120, the second button 122, the control pad 124, and/or the joystick 126 may be utilized to control the auxiliary feature 48 and/or the spray nozzle 50.

The character assembly 14 may further include the pedals 80 and the steering mechanism 76 to control movement of the mobile character control system 10. For instance, the operator 74 may press the pedals 80 to direct movement or to block movement of the mobile character control system 10 and utilize the steering mechanism 76 to control a direction of movement of the mobile character control system 10. Additionally or alternatively, the operator 74 may utilize the secondary or supplemental transportation device 106 to cause movement of the mobile character control system 10 (e.g., via a hydraulic lift that raises and/or lowers the platform 70).

As shown in the illustrated embodiment of FIG. 3, the operator 74 may also utilize stilts 130, handholds 132, or other manual controls to adjust movement of the head 28, the front legs 30 (or arms), the hind legs 32, the tail 34, the eyes 36, the mouth 38, and/or other suitable features of the character assembly 14. As such, movement of the operator 74 may be transferred to the various features of the character assembly 14 to simulate movement of the character.

As set forth above, in other embodiments, the mobile character control system 10 may be controlled remotely by the operator 74 rather than the operator 74 being positioned in the compartment 20 of the character assembly 14. In such embodiments, the operator 74 may use the remote control system 22 that includes the controls 46 to enable the operator 74 to simulate movement of the character assembly 14 from a position remote from the character assembly 14. Accordingly, the remote control system 22 may be in wireless communication with the control system 44 to enable communication between the controls 46 and the actuatable features 26. In any case, the mobile character control system 10 may simulate movement of a character and provide a lifelike experience to the guests viewing the mobile character control system 10 to enhance entertainment of the guests.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mobile character control system, comprising:
a platform configured to support an operator;
a character assembly engaged with the platform and comprising actuatable features configured to facilitate movement according to a type of motion associated with a creature;
a control system comprising one or more processors and a memory, the memory storing instructions that, when executed by the one or more processors, cause the one or more processors to:
actuate the actuatable features of the character assembly in response to signals received from control features controlled by the operator;
actuate the actuatable features of the character assembly according to a first type of motion in response to a transportation assembly moving the platform in a first manner; and
actuate the actuatable features of the character assembly according to a second type of motion in response to the transportation assembly moving the platform in a second manner; and
the transportation assembly configured to direct movement of the platform, wherein the transportation assembly is configured to support the character assembly.

2. The mobile character control system of claim 1, wherein the actuatable features are configured to actuate in different ways to cause differing motion types associated with the creature for the actuatable features based on different characteristics of the signals received from the control features.

3. The mobile character control system of claim 1, wherein the character assembly comprises one or more manual control features that enable the operator to manually direct movement of the actuatable features.

4. The mobile character control system of claim 3, wherein the one or more manual control features comprise stilts, handholds, footholds, or any combination thereof.

5. The mobile character control system of claim 1, wherein the character assembly comprises an auxiliary effect feature consistent with a theme of the character assembly.

6. The mobile character control system of claim 5, wherein the auxiliary effect feature comprises a spray nozzle configured to direct a fluid from a portion of the character assembly toward an interactive zone.

7. The mobile character control system of claim 1, comprising the control features, wherein the control features comprise a button, a control pad, a joystick, or a combination thereof.

8. The mobile character control system of claim 7, wherein the control features are configured to be interacted with by the operator and to direct the signals to the control system.

9. The mobile character control system of claim 1, comprising a supplemental transportation device configured to enable the platform to move via a manual force applied by the operator.

10. The mobile character control system of claim 9, wherein the supplemental transportation device comprises a hydraulic motion bar.

11. The mobile character control system of claim 1, wherein the transportation assembly comprises a drive configured to cause rotation of wheels to direct movement of the platform.

12. A vehicle comprising:
- a character assembly comprising structural components configured to be actuated by actuators to facilitate movement according to a type of motion associated with a character;
- an operator compartment positioned within the character assembly and including one or more control features;
- a control system comprising one or more processors and a memory, the memory storing instructions that, when executed by the one or more processors, cause the one or more processors to:
  - actuate the actuators of the character assembly based on input from the one or more control features;
  - actuate the actuators of the character assembly to move the structural components according to a first type of motion in response to a transportation assembly moving the character assembly in a straight line; and
  - actuate the actuators to move the structural components according to a second type of motion in response to the transportation assembly turning the character assembly; and
- the transportation assembly configured to support and move the character assembly.

13. The vehicle of claim 12, wherein the character assembly fully conceals the operator compartment and the control features.

14. The vehicle of claim 12, comprising additional control features located remotely from the vehicle.

15. The vehicle of claim 12, wherein the structural components comprise front legs and hind legs, wherein a first control feature of the one or more control features is configured to control the front legs, wherein a second control feature of the one or more control features is configured to control the hind legs.

16. The vehicle of claim 12, wherein the structural components comprise a head, eyes, and a mouth, wherein the control system is configured to operate the head, the eyes, and the mouth independently of one another.

17. A transportation device comprising:
- a platform configured to support an operator;
- a character assembly disposed over the platform to form an operator compartment and comprising one or more actuators configured to move one or more components of a character structure;
- a control system comprising control features and one or more processors and a memory, the memory storing instructions that, when executed by the one or more processors, cause the one or more processors to:
  - control the one or more actuators of the character assembly based on input from the control features;
  - control the one or more actuators to move the one or more components according to a first type of motion in response to a transportation assembly moving the platform at a first speed; and
  - control the one or more actuators to move the one or more components according to a second type of motion in response to the transportation assembly moving the platform at a second speed; and
- the transportation assembly configured to move the platform, wherein the character assembly is disposed on the transportation assembly.

18. The transportation device of claim 17, wherein the first type of motion corresponds to a walk, wherein the second type of motion corresponds to a gallop, and wherein the first speed is less than the second speed.

* * * * *